UNITED STATES PATENT OFFICE.

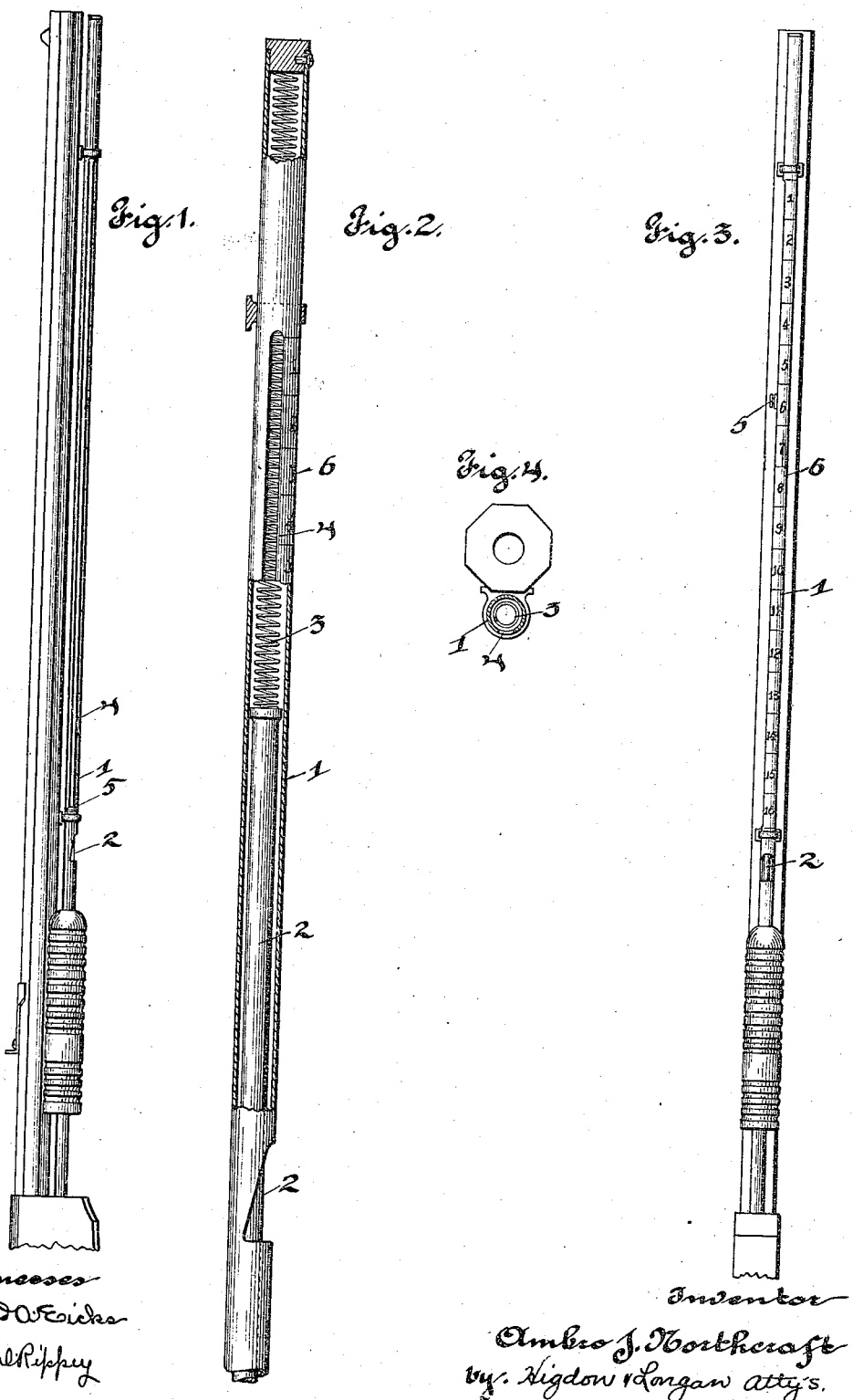

AMBRO J. NORTHCRAFT, OF ST. LOUIS, MISSOURI.

REGISTERING-MAGAZINE FOR FIREARMS.

SPECIFICATION forming part of Letters Patent No. 693,665, dated February 18, 1902.

Application filed November 5, 1901. Serial No. 81,204. (No model.)

*To all whom it may concern:*

Be it known that I, AMBRO J. NORTHCRAFT, of the city of St. Louis, State of Missouri, have invented certain new and useful Improvements in Registering-Magazines for Repeating Firearms, of which the following is a full, clear, and exact description, reference being had to the accompanying drawings, forming a part hereof.
This invention relates to a register for magazine-firearms; and it consists of the novel construction, combination, and arrangements of parts hereinafter shown, described, and claimed.
The object of this invention is to provide an improved register to be used in combination with magazine-guns for indicating the number of loads contained within the gun and also the number which have been fired.
In the drawings, Figure 1 is a side view of a gun-barrel, showing my register connected thereto. Fig. 2 is an enlarged view of the register detached from the gun-barrel. Fig. 3 is a view of the under side of the gun-barrel with the register connected thereto. Fig. 4 is an end view of the gun-barrel, the register being in sections.

My improved register consists, partially, of an elongated cylindrical magazine attached to the gun in the usual manner and adapted to contain the loads end to end and having a movable rod mounted therein, the movement of said rod being determined by the number of loads contained in the magazine. A pointer or indicator is connected to the rod and projects through a slot formed in the side of the elongated magazine and operates adjacent to a graduated scale, whereby the number of loads which have been fired and the number which are yet in the magazine may be determined.

1 indicates the magazine, which, as shown, is connected in the usual manner to the under side of the gun-barrel, and the rear end of the said magazine communicates with the usual carrier which carries the loads into the barrel.

2 indicates a rod which is mounted within the magazine 1, and the rear end of said rod bears against the end of the outer load when any loads are within the magazine, and when the gun is fired and the loads are removed from the magazine in the usual manner the rod 2 moves rearwardly a distance determined by the number of loads fired. A spring 3 is mounted in the forward end of the tube 1 and bears against the end of the rod 2, thereby actuating the same when the loads are removed. A slot 4 is formed, preferably, in one side of the magazine, and a projection or pointer 5 is attached to the rod 2 and extends through the said slot, operating adjacent to a graduated scale 6, which is formed upon the magazine. When the magazine is full, the spring 3 is compressed and the rod 2 is located near the forward end of the magazine, the indicator 5 being at the end of the graduated scale 6 at the numeral "1," which indicates that the magazine is full and that no loads have been fired. When the first load is fired, the rod 2 moves a corresponding distance into the magazine and the indicator moves to the next number on the graduated scale, thereby clearly indicating that one load has been fired and also showing the number of loads which are yet within the magazine. The operation is thus continued until the entire number of loads have been fired, and both the number which have been fired and the number which are yet within the magazine can readily be determined at any time. The register will thus be found a great convenience for readily determining the quantity of ammunition yet within the gun, which could not otherwise be done without opening the magazine.

This invention will be found especially useful in shooting-galleries, for the reason that one person can readily keep account of a number of patrons at the same time, whereas without any such registers it would be impossible for one person to keep exact account of more than one patron. Besides indicating the number of times each gun has been fired the register also shows the number of loads yet within the magazine, and therefore serves a double function.

I claim—

The improved firearm-register, comprising the elongated cylindrical magazine 1 adapted to contain the loads end to end therein and extending substantially the full length of the gun-barrel, the rod 2 mounted within one end of said magazine, the spring 3 mounted in the opposite end of said magazine and bearing directly against one end of said rod, a graduated scale 6 upon the exterior of said cylindrical magazine, and a pointer 5 attached to said rod adjacent the end thereof upon which said spring bears, said cylindrical magazine having a slot 4 through which said pointer projects, substantially as specified.

In testimony whereof I affix my signature in presence of two witnesses.

AMBRO J. NORTHCRAFT.

Witnesses:
ALFRED A. EICKS,
JOHN C. HIGDON.